United States Patent
Habitz et al.

(10) Patent No.: US 9,323,875 B2
(45) Date of Patent: Apr. 26, 2016

(54) DYNAMICALLY DETERMINING NUMBER OF SIMULATIONS REQUIRED FOR CHARACTERIZING INTRA-CIRCUIT INCONGRUENT VARIATIONS

(75) Inventors: Peter A. Habitz, Hinesburg, VT (US); Amol A. Joshi, Essex Junction, VT (US); Amith Singhee, Yonkers, NY (US); James E. Sundquist, Colchester, VT (US); Wangyang Zhang, Pittsburgh, PA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 1095 days.

(21) Appl. No.: 13/406,897

(22) Filed: Feb. 28, 2012

(65) Prior Publication Data

US 2013/0226536 A1    Aug. 29, 2013

(51) Int. Cl.
*G06F 17/50* (2006.01)

(52) U.S. Cl.
CPC ........ *G06F 17/5036* (2013.01); *G06F 17/5031* (2013.01); *G06F 17/50* (2013.01); *G06F 2217/10* (2013.01); *G06F 2217/84* (2013.01)

(58) Field of Classification Search
None
See application file for complete search history.

(56) References Cited

U.S. PATENT DOCUMENTS

| | | | |
|---|---|---|---|
| 7,421,671 B2 * | 9/2008 | Korobkov | 716/106 |
| 8,239,798 B1 * | 8/2012 | Goyal et al. | 716/113 |
| 8,813,006 B1 * | 8/2014 | Parameswaran et al. | 716/106 |
| 2006/0100873 A1 | 5/2006 | Bittner et al. | |
| 2008/0126061 A1 | 5/2008 | Hayes et al. | |
| 2008/0126064 A1 | 5/2008 | Tseng et al. | |
| 2008/0133202 A1 * | 6/2008 | Tseng et al. | 703/14 |
| 2009/0138838 A1 * | 5/2009 | Nitta et al. | 716/6 |
| 2009/0306953 A1 * | 12/2009 | Liu et al. | 703/14 |
| 2010/0287517 A1 * | 11/2010 | Buss et al. | 716/6 |
| 2011/0087478 A1 | 4/2011 | Tseng et al. | |

OTHER PUBLICATIONS

S. Sundareswaran, et-al., "Characterization of Standard Cells for Intra-Cell Mismatch Variations," IEEE Transactions on Semiconducror Manufacturing, vol. 22, No. 1, Feb. 2009, pp. 40-49.*
S. Sundareswaran, "Statistical characterization for timing sign-off: from silicon to design and back to silicon," PhD Thesis, University of Texas, 2009, 205 pages.*

(Continued)

*Primary Examiner* — Kamini S Shah
*Assistant Examiner* — David M Rogers
(74) *Attorney, Agent, or Firm* — Gibb & Riley, LLC; David A. Cain, Esq.

(57) ABSTRACT

A method is disclosed comprising using a circuit recognition engine running on a computerized device to detect a number and type of devices in an integrated circuit. The method characterizes device variation by selecting a set of dominant active devices and performing simulation using the set of dominant active devices. Three different options may be used to optimize the number of simulations for any arc/slew/load combination. Aggressive reduction uses a minimal number of simulations at the cost of some accuracy loss, conservative reduction reduces the number of simulations with negligible accuracy loss, and dynamic reduction dynamically determines the minimum number of simulations needed for a given accuracy requirement.

12 Claims, 7 Drawing Sheets

(56) References Cited

OTHER PUBLICATIONS

A. Goel, et al., "Statistical Timing Models for Large Macro Cells and IP Blocks Considering Process Variations," IEEE Transactions on Semiconductor Manufacturing, vol. 22, No. 1, Feb. 2009, 9 pages.*

A. Goel, et al., "A Methodology for Characterization of Large Macro Cells and IP Blocks Considering Process Variations," 9th International Symposium on Quality Electronic Design, ISQED 2008, Mar. 17-19, 2008, pp. 200-206.*

J. Sun, "Conquering Variability for Robust and Low Power Designs," Phd Thesis, Department of Electrical and Computer Engineering, The University of Arizona, (2011), 205 Pages.*

Duvall, S. G. (2000). Statistical circuit modeling and optimization. 5th International Worlahop on Statistical Metrologt, IEEE, pp. 56-63.

Savithri Sundareswaran, Jacob A. Abraham, Rajendran Pandam, Characterization of Standard Cells for Intra-Cell Mismatch Variations, IEEE Transactions on Semiconductor Manufacturing, vol. 22, No. 1, Feb. 2009, pp. 40-49.

* cited by examiner

DYNAMICALLY DETERMINING NUMBER OF SIMULATIONS REQUIRED FOR CHARACTERIZING INTRA-CIRCUIT INCONGRUENT VARIATIONS

BACKGROUND

The present disclosure relates to circuit modeling, and more specifically, to circuit modeling to determine the number of simulations required for characterizing intra-circuit variations.

Conventional technologies provide analysis techniques to characterize the effect of variations in transistor circuits. One method to characterize the effects of variation in a circuit uses a Monte-Carlo method of generating samples from the distribution of values of selected device parameters, applying those sample values in a plurality of circuit simulations, making circuit measurements during simulation and using a sensitivity analysis to compute the measurement variation of the circuit. The entire process requires N simulations, where N is the number of Monte Carlo sample cases required to meet a specified accuracy. Typically, N is on the order of 1,000 to 100,000 simulations.

Another method to characterize the effect of variations in a circuit is to simulate the circuit at nominal condition and make measurements. Then, for each device in the circuit and for each device parameter of a device, independently vary a selected device parameter away from nominal and simulate the circuit, making measurements to obtain measurement sensitivity, $s_i$ to the variation of the selected device parameter. Commonly used methods to calculate sensitivity $s_i$ include:

$$s_i = (p_{pso,i} - p_{neg,i})/2/p_{nom}, \text{ or}$$

$$s_i = (p_{pos,i} - p_{nom})/p_{nom}$$

where $p_{nom}$, $p_{pos,i}$ and $p_{neg,i}$ are measurements of p at nominal condition, setting selected device parameter i to positive sigma and negative sigma respectively. The overall sensitivity is then calculated by:

$$s_{total} = \sqrt{\sum_{i=1}^{N} s_i^2}$$

where N is the number of devices.
The entire process requires c·N+1 simulations, where c is the number of selected device parameters to vary for a single device.

An alternative method to reduce the number of simulations is presented herein.

SUMMARY

According to one embodiment herein, a method is disclosed comprising using a circuit recognition engine running on a computerized device to detect a number of first type devices in an integrated circuit and to detect a number of second type devices in the integrated circuit, the first type devices having an opposite polarity relative to the second type devices. All the first type devices are simultaneously perturbed and the circuit is simulated to obtain a first measure of sensitivity to a performance measure of the first type of devices. Then, all the second type devices are simultaneously perturbed and the circuit simulated to obtain a second measure of sensitivity to the performance measure of the second type of devices. Overall sensitivity of the circuit is calculated based on a ratio of the first measure of sensitivity to the number of first devices, and based on a ratio of the second measure of sensitivity to the number of second devices.

According to another embodiment herein, a method is disclosed comprising using a circuit recognition engine running on a computerized device to detect dominant devices in an arc under consideration. Each of the dominant devices is perturbed and the circuit simulated to obtain a measure of sensitivity to a performance measure of each of the dominant devices. Overall sensitivity of the circuit is calculated using an equation.

According to another embodiment herein, a method is disclosed comprising using a circuit recognition engine running on a computerized device to detect a total of devices in an integrated circuit under consideration. The total of devices is sorted into a queue according to importance of each the device in the circuit. A first device d is selected from the queue and added to set D. The device d is perturbed and the circuit is simulated to obtain a measure of sensitivity $s_d$ to a performance measure for the device d. Overall sensitivity of the circuit is calculated using an equation $$s_{total} = \sqrt{\sum_{d \in D} s_d^2}$$

where D comprises the set of devices selected from the queue. A verification equation is used to determine an error value. A next device in the queue is selected and the steps repeated as necessary until the error value is smaller than a pre-determined threshold.

According to another embodiment herein, a method of performing sensitivity analysis of devices in an integrated circuit using a multidimensional matrix is disclosed. The method comprises maintaining a first parameter position constant and performing simulations and determining a measure of sensitivity of performance measurements of the devices for all other parameter positions in relation to the first parameter position. Then, a second parameter position is maintained constant and simulations are performed and the measure of sensitivity of the performance measurements of the devices for all other parameter positions in relation to the second parameter position is determined. Simulations are performed and the measure of sensitivity of performance measurements of the devices is determined for a maximum position of all parameters in the multidimensional matrix. The measure of sensitivity of the performance measurements of the devices for all remaining positions in the multidimensional matrix is calculated. The measure of sensitivity of the performance measurements of the devices for the maximum position of all parameters in the multidimensional matrix is calculated. The accuracy of the calculation with regard to simulation at the maximum position is checked. If the accuracy of the calculation with regard to simulation at the maximum position is not within a predetermined threshold, another position is selected to maintain constant for the first or second parameter and the simulations are performed and a measure of sensitivity of performance measurements of the device for the other positions in the multidimensional matrix is determined, and accuracy of the calculation with regard to simulation at the other parameter position is checked.

Each of the methods can be incorporated in a computer readable storage medium that is readable by a computerized device and that stores instructions executable by the computerized device to perform the method.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, conventional systems use Monte Carlo techniques to randomly perturb device parameters or direct techniques to perturb device parameters in a circuit and simulate the circuit to obtain its sensitivity. These conventional techniques result in large numbers of simulations to obtain adequate sensitivity information. The systems and methods herein address this issue by reducing the number of simulations required to determine integrated circuit sensitivity to intra cell variation.

It is helpful to produce superior quality models in a shortest possible time. A fast characterization turnaround time can affect time-to-market. Quality checks can help to identify circuit design exposures early on. Embodiments described herein use library characterization in a process of creating abstract models of any circuit used for chip design that can accurately describe the circuit behavior and various electrical characteristics at various conditions during full chip analysis.

The methods herein help to address library characterization turnaround time for random intra chip variation characterization. In the methods herein, three options can be used, for example, to optimize the number of simulations for any arc/slew/load combination.

A process for aggressive reduction of the number of simulations required uses 2c+1 simulations with some accuracy trade off. A conservative reduction process achieves a reduction in the number of simulations with negligible loss of accuracy. A process for dynamic reduction of the number of simulations required dynamically determines the minimum number of simulations needed for a given accuracy requirement. The overall number of simulations per arc can be further reduced by using interpolation techniques on a slew/load table. Each of these processes is described in further detail below.

Figure 1:
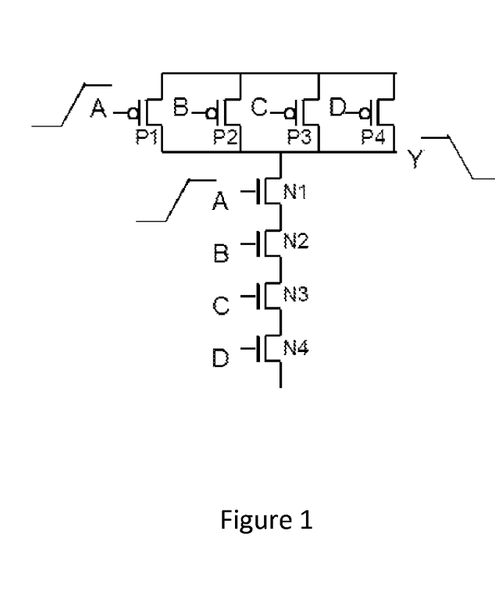
FIG. 1 is a schematic diagram illustrating a first type of arc for consideration by embodiments herein.
Figure 2:
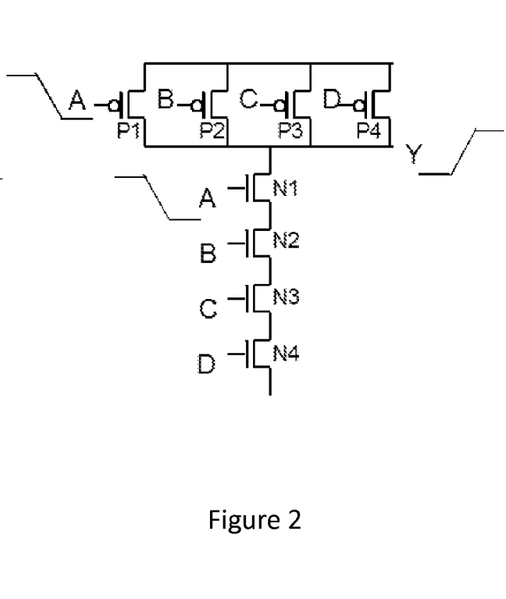
FIG. 2 is a schematic diagram illustrating a second type of arc for consideration by embodiments herein.
Figure 3:
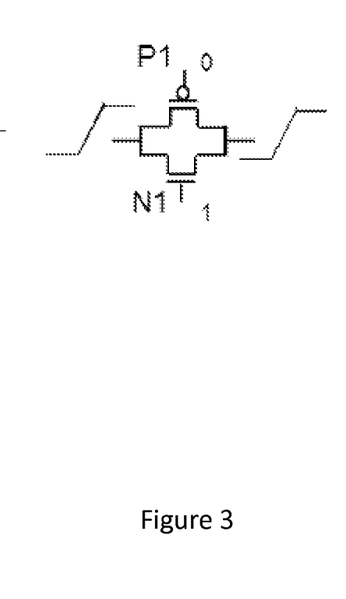
FIG. 3 is a schematic diagram illustrating a third type of arc for consideration by embodiments herein.

Referring to FIGS. 1-3, the methods described herein use a circuit recognition engine to detect the following types of devices:

On-path devices, which comprise a device on the path that switches from a non-conducting state to a conducting state, or a pass transistor that conducts the transition signal. Examples of on-path devices are shown as N1-N4 in FIG. 1, P1 in FIG. 2, and P1 and N1 in FIG. 3.

Switching devices, which comprise a device whose gate connects to a transitioning signal. Examples of switching devices are shown as N1 and P1 in FIGS. 1 and 2.

Off path devices, which comprise a device on the path that switches from a conducting state to a non-conducting state. Examples of off path devices are shown as P1 in FIG. 1 and N1-N4 in FIG. 2.

Devices that belong to one or more of the above categories are referred to as dominant devices.

While only one or a limited number of devices are illustrated in the drawings, those ordinarily skilled in the art would understand that many different types of transistor or other switching devices could be tested with the embodiment herein and the drawings are intended to show multiple different types of circuits; however, the drawings have been simplified to only show a limited number of transistors for clarity and to allow the reader to more easily recognize the different features illustrated. This is not intended to limit this disclosure because, as would be understood by those ordinarily skilled in the art, this disclosure is applicable to structures that include many of each type of device shown in the drawings.

Aspects of the present disclosure are described below with reference to flowchart illustrations and/or block diagrams of methods, apparatus (systems) and computer program products according to embodiments herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
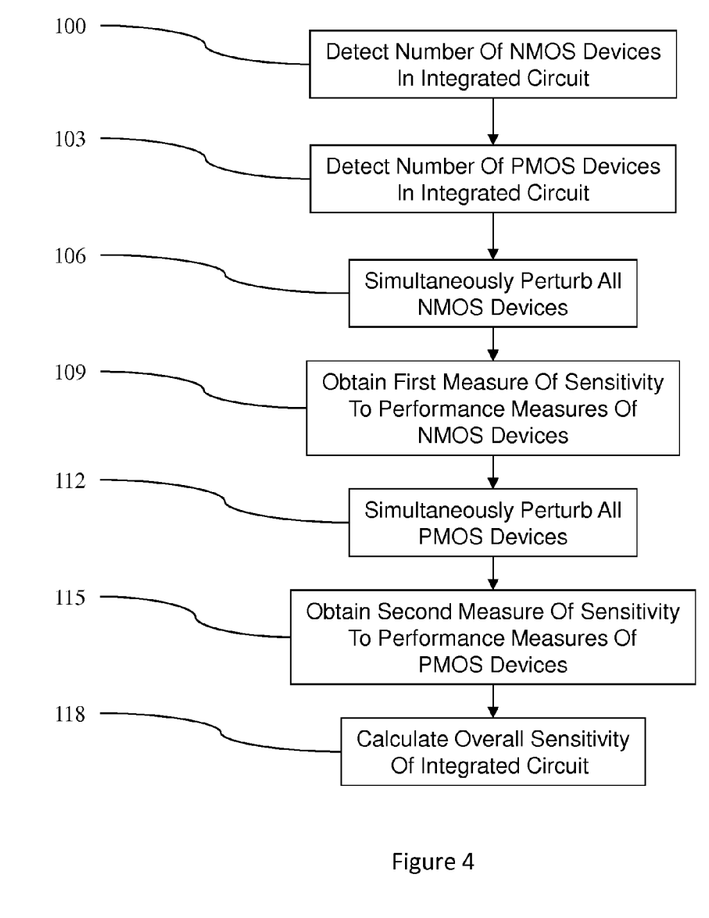
FIG. 4 is a flow diagram illustrating embodiments herein.

An exemplary embodiment of an aggressive reduction process is illustrated in FIG. 4. First, at 100, the number of NMOS devices is determined. Then, at 103, the number of PMOS devices is determined. At 106, all NMOS devices are perturbed at the same time. At 109, the circuit is simulated to determine how many NMOS devices have switched and, using performance measurements from the simulation, to obtain NMOS total sensitivity $s_{nmos}$. Then, at 112, all the PMOS devices are perturbed at the same time. At 115, the circuit is simulated to determine how many PMOS devices have switched and, using performance measurements from the simulation, to obtain PMOS total sensitivity $s_{pmos}$. Finally, at 118, overall sensitivity of the circuit is calculated. The overall sensitivity may be calculated by using an equation $$s_{total} = \sqrt{s_{nmos}^2 / num_{nmos,switch} + s_{pmos}^2 num_{pmos,switch}}$$

where $num_{nmos,switch}$ and $num_{pmos,switch}$ are the number of switching NMOS and PMOS devices respectively.

Using the aggressive reduction process, the entire process requires only 2c+1 simulations where c is the number of independent device parameters to be perturbed per device type.

Figure 5:
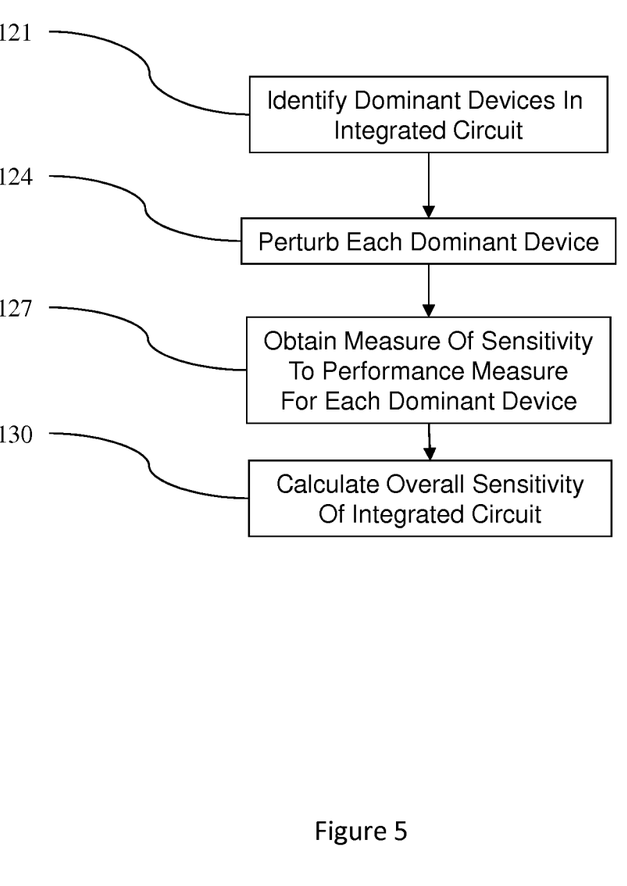
FIG. 5 is a flow diagram illustrating embodiments herein.

An exemplary embodiment of a conservative reduction process is illustrated in FIG. 5. First, at 121, the dominant devices are identified and the number of dominant devices is determined. The dominant devices include on-path devices, switching devices, and off-path devices, as described above. At 124, each dominant device i is perturbed and the circuit simulated to obtain a measure of sensitivity $s_i$ of each of the dominant devices, at 127. The sensitivity may be based on a relation to a specific performance measure. Finally, at 130, overall sensitivity of the circuit is calculated. The overall sensitivity may be calculated by using an equation $$s_{total} = \sqrt{\sum_{i \in D} s_i^2}$$

where D is the set of dominant devices.

Using the conservative reduction process, the entire process requires $c \cdot num_{dom}+1$ simulations, where c is the number of independent device parameters to be perturbed per device and $num_{dom}$ is the number of dominant devices. Normally $num_{dom}$ is approximately N/2, so approximately 50% reduction can be achieved.

Figure 6:
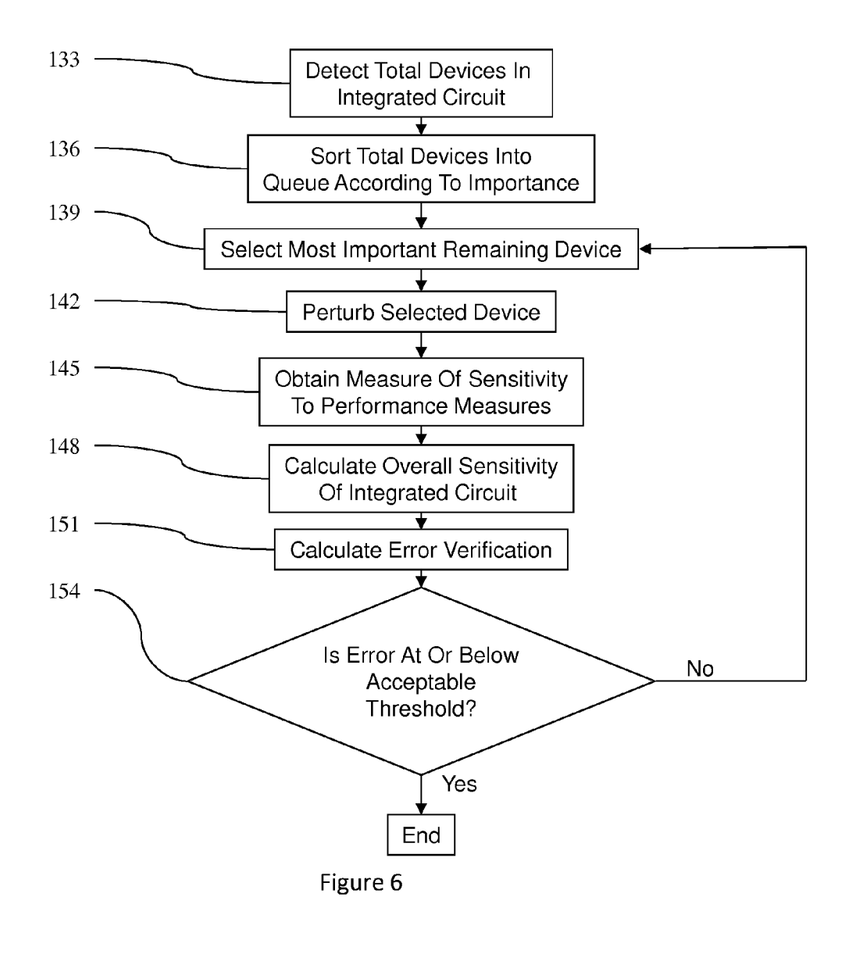
FIG. 6 is a flow diagram illustrating embodiments herein.

An exemplary embodiment of a dynamic reduction process is illustrated in FIG. 6. First, at 133, the total of devices in an integrated circuit under consideration is determined. Then, at 136, the total of devices is sorted into a queue according to the importance of each device in the circuit. According to an exemplary embodiment, the hierarchy of importance is devices that are both on-path and switching are more important than devices that are both off-path and switching, which are more important than on-path devices, which are more important than off-path devices, which are more important than switching devices, which are more important than others devices. At 139, a first most important device d is selected from the queue and added to set D. At 142, the selected device d is perturbed and the circuit simulated to obtain a measure of sensitivity $s_d$ for the device d, at 145. The sensitivity may be based on a relation to a specific performance measure. Then, at 148, overall sensitivity of the circuit is calculated. The overall sensitivity may be calculated by using an equation $$s_{total} = \sqrt{\sum_{i \in D} s_i^2}.$$

At 151, error is calculated using a verification equation, as described in further detail below. At 154, the error verification calculation is used to determine whether $s_{total}$ is accurate enough for desired purposes. If the calculated or is at or below an acceptable threshold, the process is complete. Otherwise, a next most important device d is selected from the queue and added to set D and the process is repeated.

To perform error verification, for each performance (e.g. delay, output slew) to be characterized and with an accuracy requirement, perform simulation to calculate the sensitivity $S_v$. All devices are perturbed at the same time; the direction of perturbation (positive or negative sigma) for each device is determined by the estimated sign of sensitivity for the device, described below. If a device has F fingers, then each finger is perturbed at $1/\sqrt{F}$ of the corner used to characterize the device (e.g. if the sensitivity is calculated at 3 sigma, for a device with 2 fingers each finger is perturbed at $3/\sqrt{2}$ sigma. For sensitivity $s_{total}$ is calculated from a subset of devices D, the error of $s_{total}$ can be approximately computed as $$Error = s_{total} - \sqrt{s_{total}^2 + \left(S_v - \sum_{i \in D} sign_i \cdot s_i\right)^2}$$

where $sign_i$ is the estimated sign (−1 or 1) of $s_i$.

If the error is smaller than a predetermined threshold, $s_{total}$ is accurate enough.

The sign of sensitivity for each device needs to be estimated for the error verification method, and can be obtained in a number of ways:
- If the arc has already been characterized using a traditional or conservative method, the sign can be obtained from historical data;
- The arc can be characterized using a traditional or conservative method for a particular slew/load/voltage/temperature setting, and the obtained sign can be applied to other settings; or
- The sign may be accurately estimated analytically by circuit recognition.

For analytical sensitivity sign estimation, we can define the sensitivity sign of the device to be −1, if making the device stronger (the device is more conductive when the device is on) causes lower delay. Otherwise, the sign is 1.

If the performance of interest is delay, and if the stage being considered is a single layer of logic (for example, a single layer of NAND gates, a single layer of NOR gates, or a single layer of inverters) the following method can be used to determine the sensitivity sign:

1. Partition the circuit into different stages, and determine whether each stage has a transition, which may be a rising or falling input transition
2. For each transistor within complementary logic
   a. If the transistor is NMOS, set its sensitivity to 1 if the output transition of the current stage is rising (at least one input of the stage is falling), otherwise set its sensitivity to −1.
   b. If the transistor is PMOS, set its sensitivity to 1 if the output transition of the current stage is falling (at least one input of the stage is rising); otherwise set its sensitivity to −1.
3. For each transistor within a pass gate
   a. If the transistor is an off-path device, set its sensitivity to 1, otherwise set it to −1.

If the performance of interest is output slew, use the same sensitivity sign as delay, but set the sensitivity to −1 when the device is a switching and off-path device.

Figure 7:
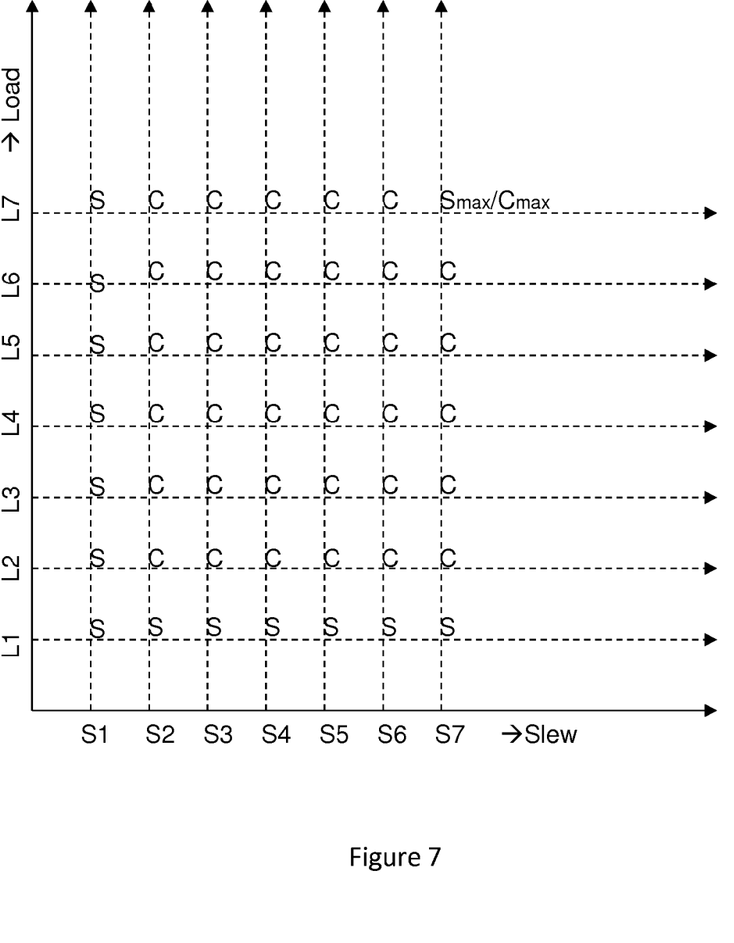
FIG. 7 is a table diagram illustrating a load/slew matrix.

Referring to FIG. 7, a 7×7 load—slew matrix is shown. Sensitivities need to be characterized for all the load—slew combinations, which in the matrix of FIG. 7 would result in 49 combinations, each of which may be tested as described with reference to FIGS. 4-6, above, resulting in hundreds of simulations required. In some case, in order to avoid interpolation errors in the static timer, more load slew points are needed to cover all the possible combinations and simulations. For example, with load—slew matrices of different sizes, the number of simulations can increase by the power of N^2. As the number of simulations increases, the cost similarly increases.

According to a further embodiment, the number of simulations in the load—slew matrix can be reduced by linear estimation throughout the matrix. It is known that delay and slew can be linear for many circuits whose output load is isolated from input slew variations. Accordingly, the delay for many load—slew combinations can be computed without using separate simulations.

Figure 8:
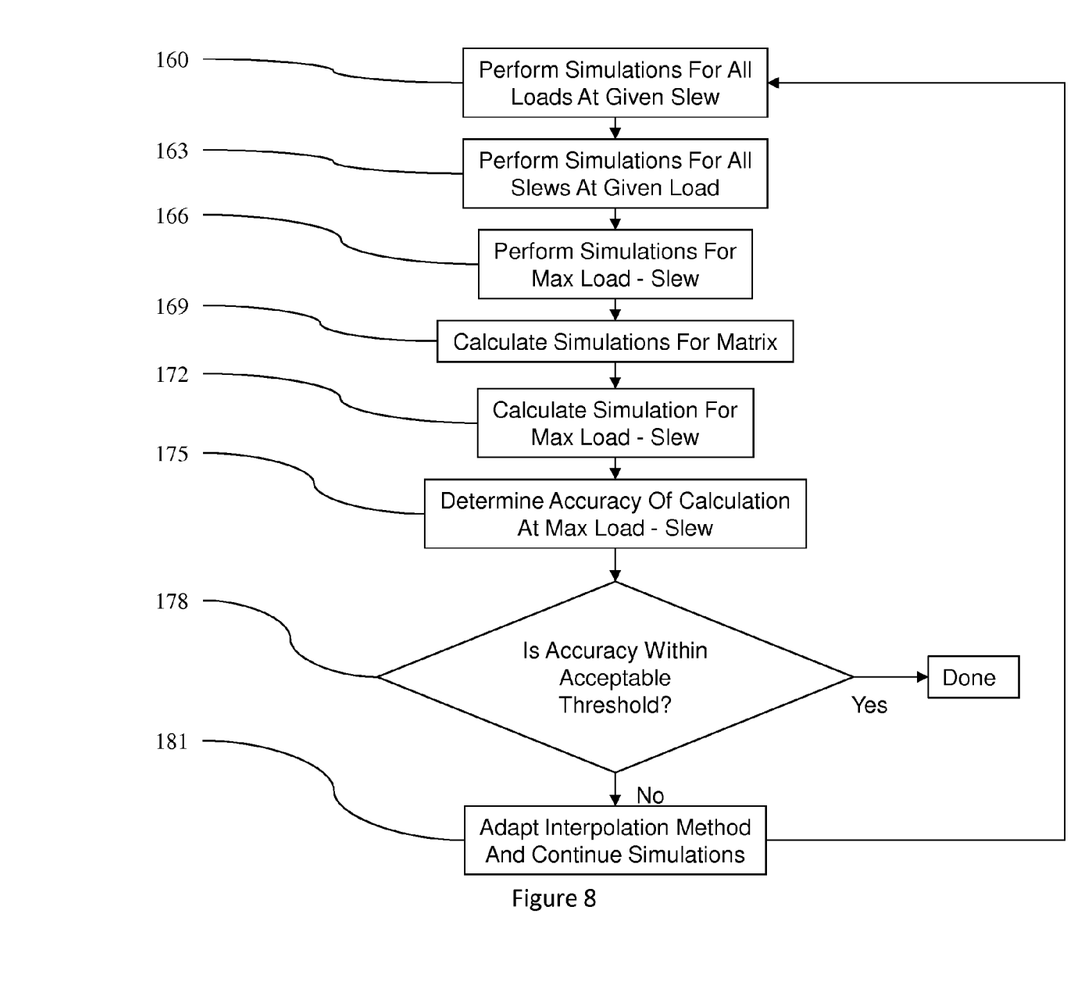
FIG. 8 is a flow diagram illustrating embodiments herein.

An exemplary embodiment of a load—slew matrix estimation process is illustrated in FIG. 8. First, at 160, perform simulations and determine a measure of sensitivity of performance measurements for all the load positions at a first slew position. Then, at 163, perform simulations and determine a measure of sensitivity of performance measurements for all the slew positions at a first load position. As shown in FIG. 7, the simulation points are labeled S, which correspond to L1-L7 at position S1 and S1-S7 at position L1. At 166, perform simulations and determine a measure of sensitivity of performance measurements for the maximum load and slew position, $S_{max}$. In the illustrated embodiment, this is position L7S7. As described above, the process may be used for other size matrices, as well. At 169, the simulation for the remaining points, C, in the matrix is calculated using a linear equation.

$$Cij = S1Li + SjL1 - S1L1.$$

At 172, the simulation for the maximum load and slew position is also calculated, $S_{max}/C_{max}$, using the same linear equation. Then, at 175, check the accuracy of the calculation with regard to the simulation at the maximum load and slew position. The accuracy may be determined using a ratio, such as $$|Sim\_S7L7/Comp\_S7L7| < A\%$$

where Sim_S7L7 is the measure of sensitivity of performance measurements using simulation at the maximum position, Comp_S7L7 is the computed measure of sensitivity of performance measurements at the maximum position, and A is an acceptable threshold, such as 2%. Other threshold values can be used. If, at 178, the accuracy is within the acceptable threshold, no further simulations are required.

The above interpolation uses a linear estimation calculation along the edges of the matrix. If, at 178, the accuracy is not within the acceptable threshold, the process can be adapted dynamically to use other interpolation methods, at 181, and continue simulations. For example, simulations can be performed along the diagonal positions (SnLm where n=m) and/or at the boundary positions (S7Ln or SnL7; where n=1 to 7). After simulating the selected positions, interpolations, such as spline interpolation, can be used on the other elements of the matrix. Any form of interpolation that constructs a new data point with an acceptable level of accuracy may be used, including, but not limited to, spline linear or spline or piecewise or any other form interpolation by itself or in conjunction with one or more interpolation methods.

The above example describes linear interpolation in a two-dimensional matrix for load and slew. The sensitivity computations may be further extended to various conditions that may affect the sensitivity analysis, such as, but not limited to, process, voltage, or temperature, among others. The two dimensional load/slew matrix may be expanded to other variables and may become three of four-dimensional. One skilled in the art can apply appropriate interpolation techniques for such multi dimensional matrix thereby saving several tens or hundreds of simulations.

As will be appreciated by one skilled in the art, aspects of the systems and methods herein may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. The computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 9:
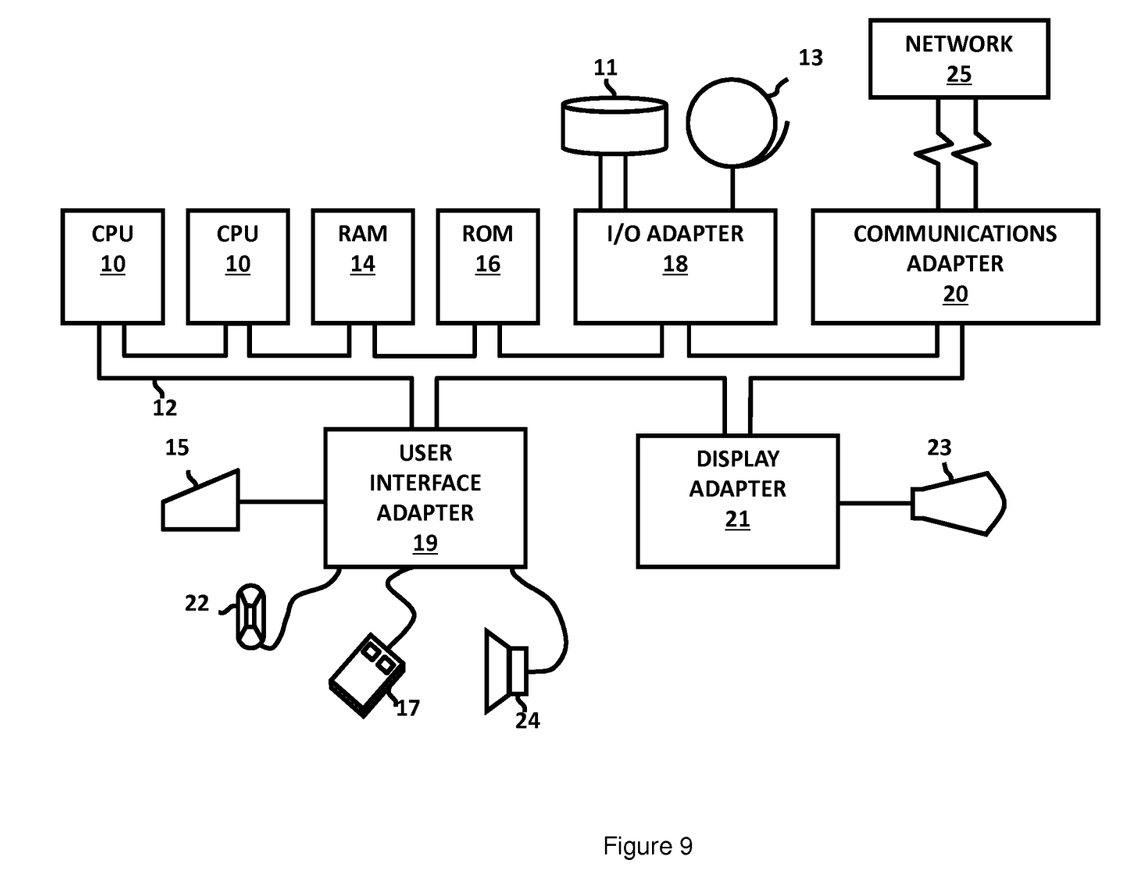
FIG. 9 is a schematic diagram of a hardware system according to embodiments herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 that may be embodied as an output device such as a monitor, printer, or transmitter, for example.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method comprising:
   using a circuit recognition engine running on a computerized device, detecting dominant devices in an arc under consideration;
   perturbing a device parameter value of each of said dominant devices, simulating said arc and making performance measurements to obtain a measure of sensitivity of said performance measurements to said perturbing said device parameter value of each of said dominant devices, using said computerized device;
   calculating, using said computerized device, overall sensitivity of said arc using an equation $$s_{total} = \sqrt{\sum_{i \in D} s_i^2}$$

where $s_{total}$ is said overall sensitivity,
   D comprises a set of said dominant devices, and
   $s_i$ is a measure of sensitivity of said performance measurements to said perturbing said device parameter value of each of said dominant devices; and
calculating, using said computerized device, an estimate of sensitivity error using an equation comprising:

$$\text{Error} = s_{total} - \sqrt{s_{total}^2 + \left(S_v - \sum_{i \in D} \text{sign}_i \cdot s_i\right)^2}$$

where $S_v$ is overall sensitivity of said arc when all device parameter values of all devices are perturbed simultaneously, and $\text{sign}_i$ is an estimated positive or negative sign of $s_i$ based on direction of perturbation.

2. The method of claim 1, further comprising:
   before perturbing each of said dominant devices, simulating said arc at nominal condition and making performance measurements to obtain a baseline performance of said arc, using said computerized device.

3. The method of claim 1, each dominant device comprising at least one of
   an on path device comprising a device on said arc that switches from non-conducting state to conducting state,
   a switching device comprising a device whose gate connects to a transitioning signal, and
   an off path device comprising a device on said arc that switches from conducting state to non-conducting state.

4. The method of claim 1, said $\text{sign}_i$ being determined by at least one of
   obtained from historical data,
   obtained using a traditional or conservative method for a particular setting of slew, load, voltage, and temperature, and
   obtained analytically by circuit recognition.

5. A method comprising:
   using a circuit recognition engine running on a computerized device to detect a total of devices in an integrated circuit under consideration;
   sorting said total of devices into a queue according to importance of each device in said integrated circuit, using said computerized device;
   selecting a first device d from said queue and adding said first device d to set D, using said computerized device;
   perturbing a device parameter value of said first device d, using said computerized device;
   simulating said integrated circuit and making performance measurements to obtain a measure of sensitivity $s_d$ of said performance measurements to said perturbing said device parameter value of said first device d, using said computerized device;
   calculating overall sensitivity of said integrated circuit using an equation $$s_{total} = \sqrt{\sum_{d \in D} s_d^2}$$

where D comprises a set of devices selected from said queue, using said computerized device;

using a verification equation to determine an error value, using said computerized device, said verification equation comprising:

$$\text{Error} = s_{total} - \sqrt{s_{total}^2 + \left(S_v - \sum_{i \in D} \text{sign}_i \cdot s_i\right)^2}$$

where $S_v$ is overall sensitivity of an arc when all device parameter values of all devices are perturbed simultaneously, $\text{sign}_i$ is an estimated positive or negative sign of $s_i$ based on direction of perturbation and $s_i$ equals $s_{d}$; and selecting a next device in said queue and testing as necessary until said error value is smaller than a predetermined threshold.

6. The method of claim 5, further comprising:

before sorting said total of devices into a queue, simulating said integrated circuit at nominal condition and making performance measurements to obtain a baseline performance of said integrated circuit, using said computerized device.

7. The method of claim 5, said importance of each said device in said integrated circuit comprising:

on-path devices that are switching devices being more important than off-path devices that are switching devices, said off-path devices that are switching devices being more important than on-path devices that are not switching devices, said on-path devices that are not switching devices being more important than off-path devices that are not switching devices, said off-path devices that are not switching devices being more important than switching devices that are not related to said integrated circuit under consideration and not having an effect upon a performance path of said integrated circuit, and said switching devices that are not related to said integrated circuit under consideration and not having an effect upon the performance path of said integrated circuit being more important than other devices that are not related to said integrated circuit under consideration and not having an effect upon the performance path of said integrated circuit.

8. The method of claim 5, said $\text{sign}_i$ being determined by at least one of obtained from historical data, obtained using a traditional or conservative method for a particular setting of slew, load, voltage, and temperature, and obtained analytically by circuit recognition.

9. A method of performing sensitivity analysis of devices in an integrated circuit, said method comprising:

creating a multidimensional matrix of performance parameters for an integrated circuit;

maintaining a first parameter position constant and performing simulations and determining a measure of sensitivity of performance measurements of said devices for all other parameter positions in relation to said first parameter position;

maintaining a second parameter position constant and performing simulations and determining said measure of sensitivity of said performance measurements of said devices for all other parameter positions in relation to said second parameter position;

performing simulations and determining said measure of sensitivity of performance measurements of said devices for a maximum position of all parameters in said multidimensional matrix;

calculating said measure of sensitivity of said performance measurements of said devices for all remaining positions in said multidimensional matrix;

calculating said measure of sensitivity of said performance measurements of said devices for said maximum position of all parameters in said multidimensional matrix;

checking accuracy of said calculation with regard to simulation at said maximum position; and responsive to said accuracy of said calculation with regard to simulation at said maximum position not being within a predetermined threshold, selecting another parameter position in said multidimensional matrix to maintain constant for said first parameter or said second parameter and performing simulations and determining a measure of sensitivity of performance measurements of said devices for other parameter positions in said multidimensional matrix and checking accuracy of said calculation with regard to simulation at said other parameter positions, said performing simulations and determining said measure of sensitivity of performance measurements of said devices further comprising:

using a circuit recognition engine running on a computerized device to detect dominant devices in an arc under consideration;

perturbing a device parameter value of each dominant device, simulating said circuit and making performance measurements to obtain a measure of sensitivity of said performance measurements to said perturbing said device parameter value of said each dominant device, using said computerized device;

calculating, using said computerized device, overall sensitivity of said circuit using an equation $$s_{total} = \sqrt{\sum_{i \in D} s_i^2}$$

where $s_{total}$ is said overall sensitivity,

D comprises a set of said dominant devices, and $s_i$ is a measure of sensitivity of said performance measurements to said perturbing said device parameter value of said each dominant device; and calculating, using said computerized device, an estimate of sensitivity error using an equation comprising:

$$\text{Error} = s_{total} - \sqrt{s_{total}^2 + \left(S_v - \sum_{i \in D} \text{sign}_i \cdot s_i\right)^2}$$

where $S_v$ is overall sensitivity of said arc when all device parameter values of all devices are perturbed simultaneously, and $\text{sign}_i$ is an estimated positive or negative sign of $s_i$ based on direction of perturbation.

10. The method of claim 9, said multidimensional matrix comprising a load—slew matrix, said calculating said measure of sensitivity of said performance measurements of said devices further comprising using an equation:

$Cij = S1Li + SjL1 - S1L1$ where $C_{ij}$ is a calculation of said measure of sensitivity of said performance measurements at position ij of said load—slew matrix, $S1L_i$ is said measure of sensitivity of said performance measurements at slew position 1 and load position i of said load—slew matrix, $S_jL1$ is said measure of sensitivity of said performance measurements at slew position j and load position 1 of said load—slew matrix, and $S1L1$ is said measure of sensitivity of said performance measurements at slew position 1 and load position 1 of said load—slew matrix.

11. The method of claim 9, said calculating said measure of sensitivity of said performance measurements of said devices further comprising:

using interpolation techniques to construct a new data point for said measure of sensitivity of performance measurements in said multidimensional matrix, said new data point having a level of accuracy within an acceptable threshold.

12. The method of claim 9, said performing simulations and determining said measure of sensitivity of performance measurements of said devices further comprising:

using a circuit recognition engine running on a computerized device, detecting a number of first type devices in an integrated circuit and detecting a number of second type devices in said integrated circuit, said first type devices having an opposite polarity relative to said second type devices;

simultaneously perturbing device parameter values of all said first type devices, using said computerized device;

simulating said integrated circuit and making performance measurements during simulation to obtain a first measure of sensitivity of said performance measurements to said perturbing said device parameter values of said first type devices, using said computerized device;

simultaneously perturbing device parameter values of all said second type devices, using said computerized device;

simulating said integrated circuit and making performance measurements during simulation to obtain a second measure of sensitivity of said performance measurements to said perturbing said device parameter values of said second type devices, using said computerized device; and calculating overall sensitivity of said performance measurements to said perturbing said device parameter values of said integrated circuit based on a ratio of said first measure of sensitivity to said perturbing said device parameter values to a number of first type devices, and based on a ratio of said second measure of sensitivity to said perturbing said device parameter values to a number of second type devices, using said computerized device, said calculating said overall sensitivity of said performance measurements comprising calculating the root mean square of said first measure of sensitivity and said second measure of sensitivity for all of said first type devices and said second type devices.

* * * * *